Figure 1:
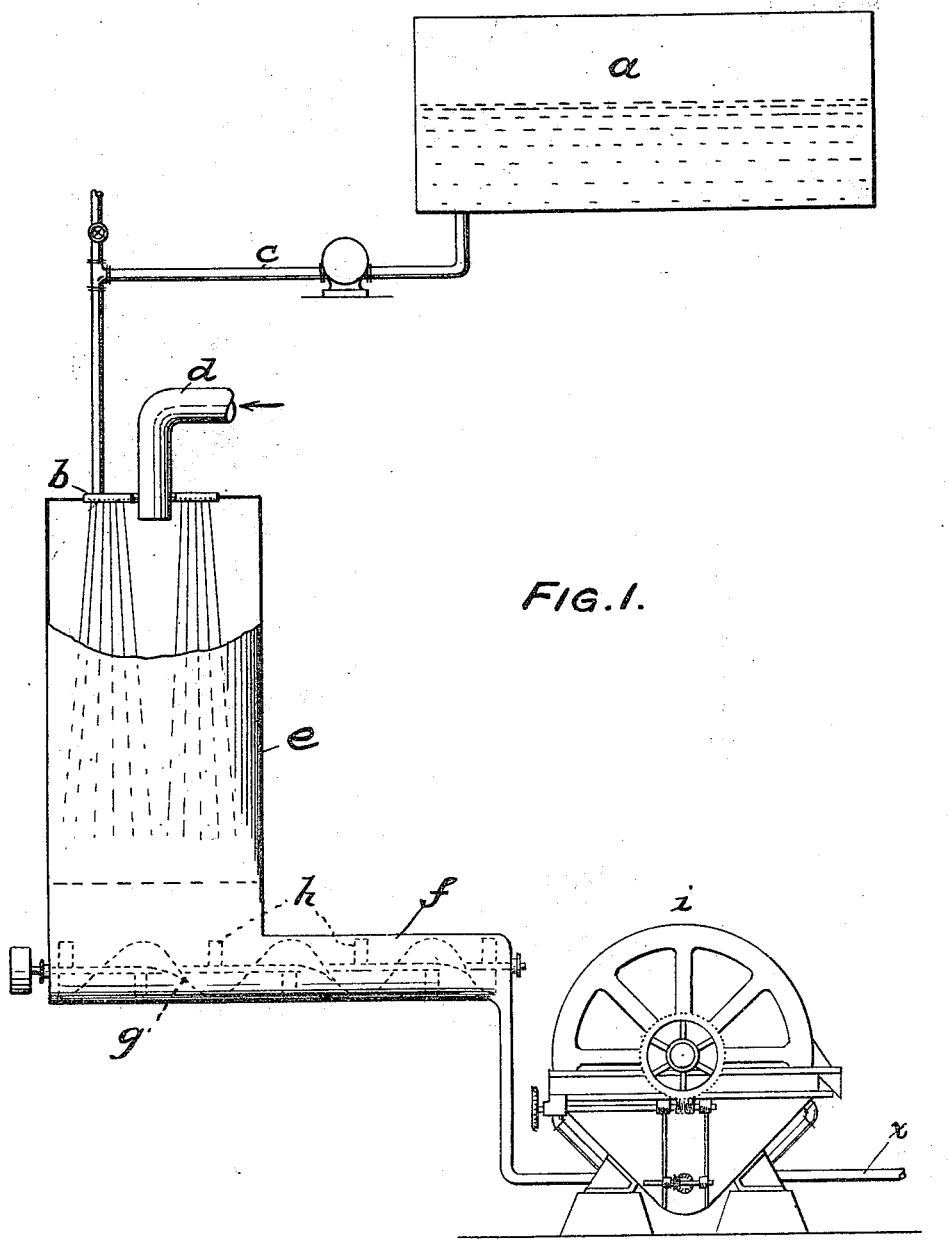

C. F. BIERBAUER & L. S. FINCH.
PROCESS OF PRODUCING AMMONIA FROM ALKALI CYANID.
APPLICATION FILED JULY 23, 1918.

1,295,262.

Patented Feb. 25, 1919.
2 SHEETS—SHEET 1.

WITNESS:

INVENTORS
Carl F. Bierbauer and
Leon S. Finch
Frank S. Busser
ATTORNEY.

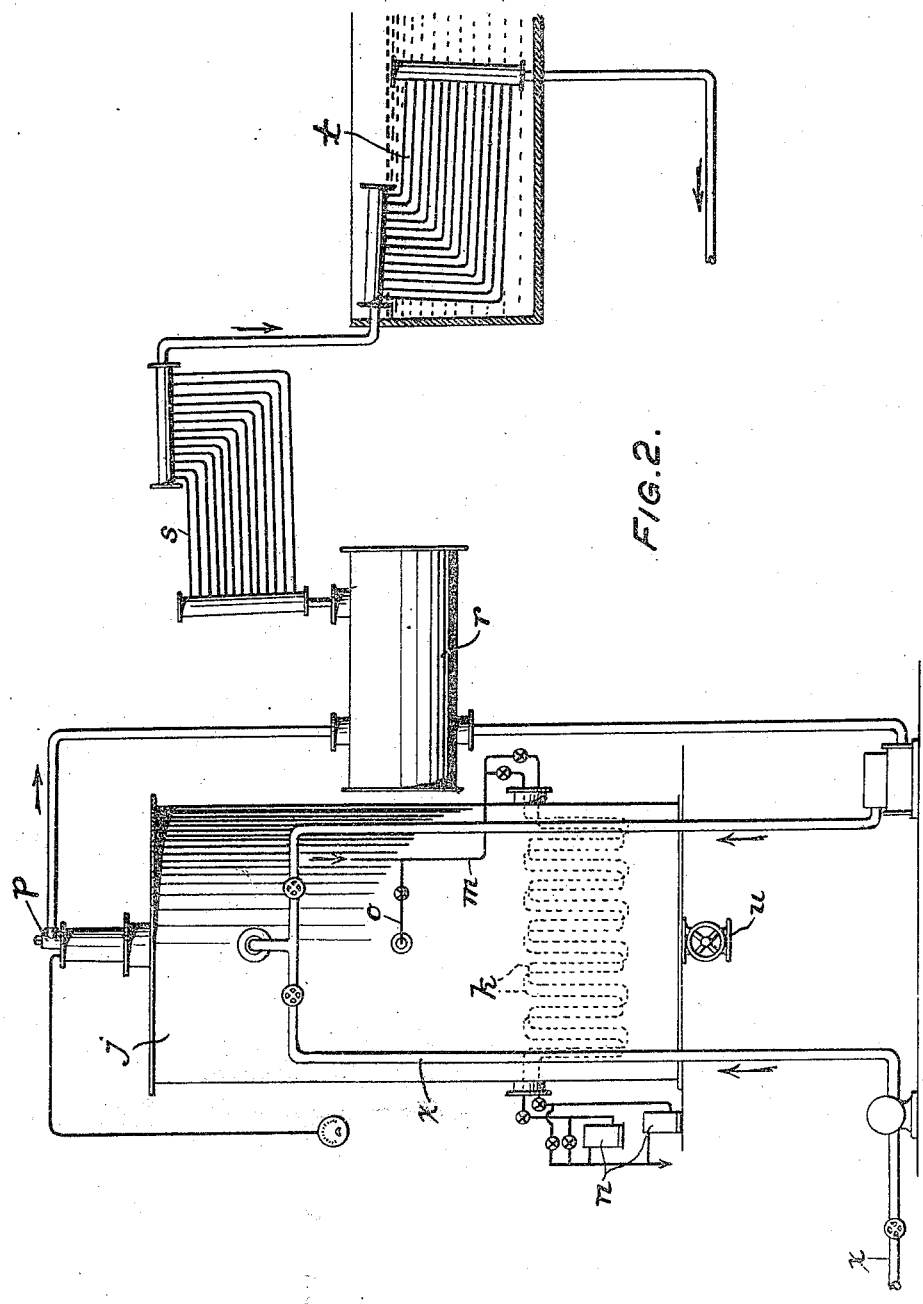

UNITED STATES PATENT OFFICE.

CARL F. BIERBAUER, OF KENVIL, AND LEON S. FINCH, OF DOVER, NEW JERSEY, ASSIGNORS TO HERCULES POWDER COMPANY, OF WILMINGTON, DELAWARE, A CORPORATION OF DELAWARE.

PROCESS OF PRODUCING AMMONIA FROM ALKALI CYANID.

1,295,262.  Specification of Letters Patent.  Patented Feb. 25, 1919.

Application filed July 23, 1918. Serial No. 246,279.

*To all whom it may concern:*

Be it known that we, CARL F. BIERBAUER and LEON S. FINCH, citizens of the United States, residing, respectively, at Kenvil and Dover, county of Morris, and State of New Jersey, have invented a new and useful Improvement in Processes of Producing Ammonia from Alkali Cyanid, of which the following is a full, clear, and exact description, reference being had to the accompanying drawings, which form a part of this specification.

This invention relates to the hydrolysis of alkali metal cyanids into ammonia and other compounds. The invention is applicable to the production of ammonia from cyanid produced by passing nitrogen over a mixture of an alkali or alkaline earth metal compound (such as sodium carbonate) and carbon, or carbon and finely divided iron, to form a cyanid of the alkali metal used. This method is old and well known and has been successfully practised and even commercially used in Europe. The process, however, has not gone into general use, largely because of the practical difficulties encountered in the attempt to secure a good yield of ammonia from the cyanid.

It is well known that when cyanids are subjected to the action of steam at a relatively high temperature ammonia is formed. With sodium cyanid, the equation would be:

(1)  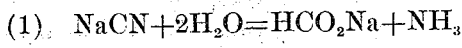

Where, however, the product of the cyanid-forming reaction contains carbon, iron, sodium ferro-cyanid, sodium hydrate and sodium carbonate, the simple method of distilling with steam, or the rather obvious expedient of adding water and heating under pressure in an autoclave, gives comparatively poor results. Nor are the difficulties more than partly overcome by the removal of the insoluble materials (carbon and iron).

The object of our invention is to provide an inexpensive process whereby the ammonia may be recovered in practically quantitative yields at a moderate expense.

While the process is applicable to the production of ammonia from cyanids produced by the method hereinbefore mentioned, it is not limited in its application to cyanids produced by any particular process and is even applicable to pure cyanids.

While the process is not dependent for its execution upon any particular apparatus, it is preferred to carry out the process in an apparatus constructed substantially in accordance with the accompanying drawings, wherein:—

Figures 1 and 2 are diagrammatic views showing two parts of the apparatus.

The cyanized material, which may contain sodium cyanid, sodium hydrate, small quantities of sodium ferro-cyanid, sodium carbonate and sodium sulfate, and insoluble substances, which may be carbon and iron, or carbon alone, is preferably first cooled in an atmosphere of nitrogen. One part of the powdered cyanized material is blown into a spray of one to three parts of water or weak liquor. $a$ represents the water or weak-liquor-storage tank, $b$ the spray-head connected by pipe $c$ with tank $a$, $d$ the feed for the dry powder, and $e$ the mixer, on the top of which the dry powder feed and the spray-head are mounted. The bottom of the mixer $e$ opens into one end of an agitator, consisting of a narrow horizontal cylinder or chamber $f$ through which extends longitudinally a screw conveyer $g$ provided with beaters $h$. The outlet of the agitator communicates with a filter $i$. This filter is preferably of the rotary continuous type, and is well known in the art, and its construction need not, therefore, be described.

If the cyanized material contains iron, which it will if iron is used as the catalytic agent in the preparation of the cyanized material, the formation of sodium ferro-cyanid proceeds upon the mixture of the material with water. In the preferred way of carrying out the process, it is desirable to avoid the formation of sodium ferro-cyanid in substantial quantities, as the hydrolysis of sodium ferro-cyanid to ammonia is more difficult than is the hydrolysis of sodium cyanid to ammonia. By the use of the continuous dissolving or mixing apparatus described, followed by rapid filtration, which can be effected in a continuous rotary filter, the time that the aqueous cyanid solution is in contact with the finely divided iron may be cut to a minimum, and if the original cyanid mixture is comparatively free of ferro-cyanid, very little ferro-cyanid will pass out of the filter.

The strong sodium cyanid solution obtained from the filtration passes, through a pipe $x$, to a still $j$, which may be maintained about half-filled. Within the still, preferably the lower part, are steam coils $k$, which at one end are connected with steam inlet pipes $m$ and at the other end with steam traps $n$. There is also a steam pipe $o$ entering the interior of the still, which provides an efficient way to rapidly heat the contents of the still when the solution becomes too concentrated. The pipe $o$ should extend beneath the surface of the cyanid solution.

At the top of the still is a pressure relief valve $p$ which controls the passage of the distillate to a trap tank $r$. The trap $r$ is also connected with a reflux condenser $s$ which may be air-cooled, but which is preferably water-cooled. The condenser $s$ is connected with an ordinary water-cooled condenser $t$, which is tipped downward so as to drain into a neutralizing tub (not shown).

Steam at 125 pounds pressure may be conveniently used, although the steam pressure may be as low as 50 pounds or even lower. A pressure higher than 125 pounds is practicable, but in the preferred process it is unnecessary. Similar autoclave processes usually require superheated steam, or steam above 125 pounds pressure. If the solution in the still is too concentrated, it is advisable to admit steam direct into the still, thereby more rapidly heating the contents and at the same time reducing the concentration. When the solution is of the concentration desired, steam should be admitted solely to the steam coils.

The higher the pressure within the still, the more rapid is the hydrolysis. It is found desirable to set the relief valve to open only when the pressure exceeds approximately fifty pounds to the square inch. Hydrolysis of solutions of sodium cyanid of varying concentration takes place readily at a pressure of thirty pounds to the square inch, or even at a lower pressure. The pressure of fifty pounds to the square inch may be safely exceeded.

The pressure of the steam and the pressure maintained within the tank may be varied within rather wide limits, dependent upon the composition of the solution, its concentration and the desired rate of distillation. For commercial operation, steam at 125 pounds pressure and a pressure within the tank of 50 pounds are preferred. Substantial uniformity of pressure, which is secured by means of the relief valve, is of importance, and seems to be necessary in order that the process shall operate efficiently and without mechanical trouble.

The distillate (steam and ammonia) escaping at the relief valve passes to the trap tank $r$ and thence to the reflux (preferably water-cooled) condenser $s$. Nearly all the moisture which escapes with the ammonia is condensed in the condenser $s$ and returns to the trap tank. The ammonia which passes on through the condenser $s$ is cooled by passing through the water-cooled condenser $t$, which drains into the neutralizing tub above mentioned.

At the start of the run gaseous ammonia is produced and at the end of the run aqueous ammonia. It is not especially sought, however, to produce gaseous ammonia, but strong ammonia solution, so that the subsequent neutralized liquor will require as little evaporation as possible. Hence, all distillate which collects in condenser $t$ is allowed to pass into the neutralizing tub.

The ammonia which passes through condenser $t$ is stronger than that which is condensed by the reflux condenser $s$. The strength of the ammonia which passes into the neutralizing tub depends upon the relative sizes of the two condensers and the manner in which the condenser $s$ is cooled. A relatively large reflux condenser will condense relatively more moisture and the ammonia passing through condenser $t$ will be relatively stronger, provided other operations are the same.

The aqueous ammonia which collects in the trap tank $r$ is much weaker than that which passes into the neutralizing tub. This weak distillate may be utilized as such, or it may be pumped back into the hydrolizing still and redistilled, giving a strong ammonia. The pumping back into the still of this weak aqueous ammonia is also advantageous in that the liquor in the still is prevented from reaching too high a concentration.

The sludge left in the still may be drawn off through a valve gate $u$ and is used in the manufacture of more sodium cyanid, or for the production of formate compounds.

By the process described, from 60 to 95 per cent. of the theoretical ammonia distils off during the first hour. At end of less than four hours practically 100 per cent. of the theoretical ammonia is distilled off. These results are attained with a full sized apparatus operating on a commercial scale. The rate at which the ammonia distils off will depend upon the size and construction of the apparatus, the temperature and pressure, and the concentration of the liquor in the tank.

The solution of sodium cyanid should contain at least enough water to satisfy the equation given at the beginning of this specification. While actual practice demonstrates the success of the process as applied to sodium cyanid containing the impurities specified herein, it is believed that the process will operate equally well where other impurities are present as the result of producing the cyanid by processes other than that herein mentioned. Impurities do not apparently affect the reaction. Nor is the process limited to a cyanid produced from sodium carbonate. However, no substantial proportion of any sodium ferro-cyanid that is contained in the solution can apparently be converted to ammonia by maintaining within the tank a steam pressure as low as 50 pounds to the square inch, the hydrolysis of sodium ferro-cyanid requiring a pressure of from 80 to 200 pounds per square inch in order to obtain sufficient yields, and at 80 pounds pressure the action is quite slow, the higher the pressure the more rapid being the hydrolysis. The steam pressure required for the hydrolysis of sodium ferro-cyanid to ammonia being thus quite different from that required for the treatment of sodium cyanid (although the treatments of both have important features in common), it may be desirable, if the original cyanid mixture is composed largely of ferro-cyanid, to hydrolyze the solution under steam pressure conditions adapted to the treatment of ferro-cyanid. In an application filed of even date herewith, Serial No. 246,360 the production of ammonia from alkali metal ferro-cyanid, and the preliminary production of alkali metal ferro-cyanid from alkali metal cyanid or a mixture of alkali metal cyanid and alkali metal ferro-cyanid, are specifically described and claimed.

While the cyanid herein described is preferably produced from sodium carbonate, because of its cheapness and availability, the cyanid may be made from other alkali or alkaline earth metal compounds. Generally speaking, the process is applicable to any cyanogen compound of any alkali or alkali earth metal, whether pure or impure, it being understood that in the known processes for producing cyanid, especially those in which an alkali metal salt and carbon, with or without the addition of finely divided iron, are acted upon by nitrogen, the presence of impurities corresponding to those hereinbefore mentioned, is unavoidable. One of the advantages of the process is that it is not essential, on the one hand, to purify the solution resulting from leaching the material from the furnaces, nor on the other hand, to make any additions to the leached solution.

In view of the fact that the principal features of the process herein described are common to the treatment of both alkali metal cyanid and alkali metal ferro-cyanid, and that in the treatment of alkali metal ferro-cyanid the same process is used as herein described but modified by features of independent novelty, it is not intended in the claims, except where otherwise clearly indicated, by the use of the term "alkali metal cyanid" to exclude alkali metal ferro-cyanid. In other words, the present invention is generic, as well as specified to the hydrolysis of ammonia from cyanid, the hydrolysis to ammonia of alkali metal ferro-cyanid being in the nature of a specific improvement on the generic invention.

Having now fully described our invention, what we claim and desire to protect by Letters Patent is:

1. The process of producing ammonia from a solution of alkali metal cyanid which comprises distilling off the ammonia by heat while maintaining the solution under a substantially constant pressure.

2. The process of producing ammonia from a solution of alkali metal cyanid which comprises subjecting the solution to heat and pressure within a confined still and providing for the intermittent escape of the distillate whenever the pressure reaches a predetermined maximum.

3. The process of producing ammonia from a solution of alkali metal cyanid which comprises heating the solution both by direct injection of steam and by exterior application of heat.

4. The process of producing ammonia from a solution of alkali metal cyanid which comprises subjecting the solution to heat and pressure to distil off ammonia and water vapor, and condensing out water vapor from the distillate and returning it to the still, thereby preventing the solution undergoing distillation from reaching too high a concentration.

5. The process of producing ammonia from a solution of alkali metal cyanid which comprises distilling off the ammonia by heat, maintaining the solution under a substantially constant pressure and adding water to the solution during distillation.

6. The process of producing ammonia from a solution of alkali metal cyanid which comprises distilling off ammonia and water vapor while maintaining the solution under a substantially constant pressure, condensing out water vapor from the distillate, and returning the condensed vapor to the solution.

7. The process of producing ammonia from a solution of alkali metal cyanid which comprises distilling off ammonia and water vapor, and subjecting the distillate to a plurality of successive condensations at progressively decreasing temperatures.

8. The process of producing ammonia from a solution of alkali metal cyanid which comprises distilling off ammonia and water vapor while maintaining the solution under a substantially constant pressure, condensing out water vapor from the distillate, returning the condensed vapor to the solution, and subjecting the uncondensed distillate to further condensation.

9. The process of producing ammonia from a solution of alkali metal cyanid which comprises subjecting the solution to heat and pressure to distil off ammonia and water vapor, condensing out water vapor from the distillate and allowing it to accumulate, and intermittently returning portions of the accumulated condensed water vapor to the body of the solution undergoing distillation.

10. The process of producing ammonia from a mixture of alkali metal cyanid and material insoluble in water, which consists in adding a liquor consisting wholly or mainly of water to the mixture, mixing and agitating, removing the insoluble material from the solution, and distilling off the ammonia by heat and pressure.

11. The process of producing ammonia from a mixture of alkali metal cyanid and material insoluble in water, which consists in adding a liquor consisting wholly or mainly of water to the mixture, mixing and agitating, removing the insoluble material from the solution, and distilling off the ammonia from the solution by heat while maintaining the solution under a substantially constant pressure.

12. The process of producing ammonia from a mixture of alkali metal cyanid, iron and carbon, which consists in adding to the mixture a liquor consisting wholly or mainly of water and immediately agitating and removing the iron and carbon from the solution by quick filtration before any substantial part of the iron reacts to form any substantial quantity of ferro-cyanid, and then hydrolyzing to ammonia, the hydrolysis being effected by heat while maintaining the solution under a substantially constant pressure.

13. The process of producing ammonia from a mixture of alkali metal cyanid, iron and carbon, which consists in blowing the cyanid mixture into a spray of water, agitating, continuously filtering to separate the insoluble material from the cyanid solution, and distilling off the ammonia by heat while maintaining the solution under a substantially constant pressure.

14. The process of preparing an alkali metal cyanid solution for distilling off ammonia, which consists in adding to a mixture of alkali metal cyanid and material insoluble in water a liquor consisting wholly or mainly of water, mixing and agitating, and removing the insoluble material from the solution.

15. The process of preparing an alkali metal cyanid solution for distilling off ammonia which consists in adding to a mixture of alkali metal cyanid and material insoluble in water a liquor consisting wholly or mainly of water, mixing and agitating, passing the solution through a filtering medium, passing water through the filtering medium to remove any soluble salts adhering thereto, and utilizing the resultant weak cyanid solution in mixing and agitating with subsequent mixtures of cyanid and insoluble material.

16. The process of preparing an alkali metal cyanid solution for distilling off ammonia, from a mixture of alkali metal cyanid, iron and carbon, which consists in adding to the mixture a liquor consisting wholly or mainly of water and immediately agitating and removing the iron and carbon from the solution by quick filtration before any substantial part of the iron reacts with the mixture to form any substantial quantity of ferro-cyanid.

17. The process of preparing an alkali metal cyanid solution for distilling off ammonia, from a mixture of alkali metal cyanid, iron and carbon, which consists in blowing the cyanid mixture into a spray of water, agitating, and continuously filtering to separate the insoluble material from the cyanid solution.

In testimony of which invention, we have hereunto set our hands at Kenvil, New Jersey, on this 19th day of July, 1918.

CARL F. BIERBAUER.
LEON S. FINCH.